Dec. 10, 1946.  A. R. VAN C. WARRINGTON  2,412,483
THERMAL PROTECTIVE DEVICE
Filed July 22, 1943
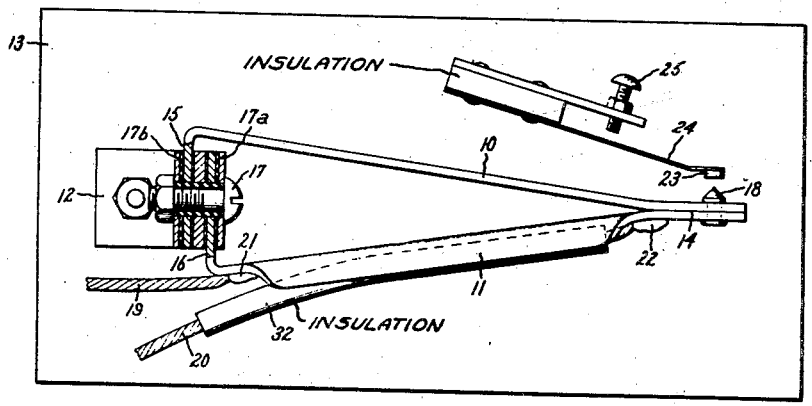
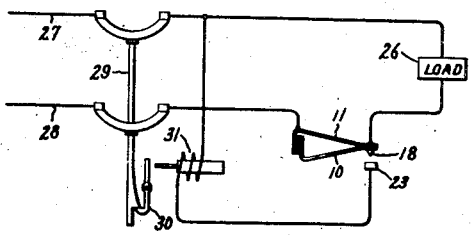
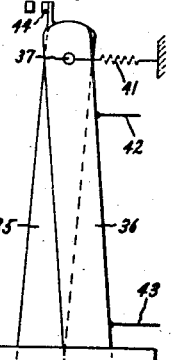
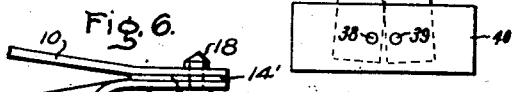
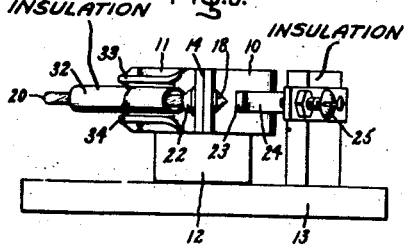
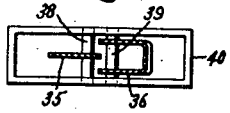
Inventor:
Albert R. van C. Warrington,
by Harry E. Dunham
His Attorney.

Patented Dec. 10, 1946

2,412,483

UNITED STATES PATENT OFFICE 2,412,483

THERMAL PROTECTIVE DEVICE

Albert R. van C. Warrington, Wallingford, Pa., assignor to General Electric Company, a corporation of New York Application July 22, 1943, Serial No. 495,706

13 Claims. (Cl. 200—113)

My invention relates to thermal protective devices, more particularly to thermal current responsive devices for opening an electric circuit in the event of a fault current of short-circuit magnitude in the circuit, and has for one of its objects a simple and very inexpensive device of this character which differs from other thermal relays in that it operates and resets rapidly and is unaffected by ambient temperature, load current flowing prior to the fault, and is capable of withstanding heavy shocks.

Another object is a simple, inexpensive impedance relay, which has a time impedance characteristic hitherto only obtainable in much more complex and expensive relay constructions.

In carrying out my invention in one form, I provide a thermal current responsive device comprising two bars or strips of the same metal having a high temperature coefficient of expansion and extending at an acute angle with each other. The intersecting ends of the bars at the apex of the angle are integrally connected together, while the other ends are connected to each other and to a support in insulating relation with each other and the support. Thus the integrally connected ends are moved laterally in response to unequal expansions of the bars. One of the bars is heated in accordance with the current in the circuit to be protected. Under current conditions in the circuit up to and including overload current conditions, heat is transferred by conduction through the integral connection of the other strip, and also by convection and radiation, with sufficient rapidity to maintain substantially the temperatures of the bars equalized. To facilitate this rapid transfer of heat, the bars are made to present a considerable area of contact and are arranged flatwise with respect to each other.

In a modified form of my invention, the bars are connected to each other and to a support by pivots, and a spring is provided to take up any looseness in the pivot connections.

For a more complete understanding of my invention, reference should be had to the accompanying drawing in which Fig. 1 is a plan view of a thermal protective device embodying my invention; Fig. 2 is a diagram showing the device connected in an electric circuit thereby protected; Fig. 3 is an end elevation view of Fig. 1 showing details of construction; Fig. 4 is an elevation view of a modified form of my invention; Fig. 5 is a plan view of Fig. 4 partly in section; and Fig. 6 is a partial view of a modification of the embodiment of my invention shown in Fig. 1.

Referring to the drawing, I have shown my invention in one form as comprising two juxtaposed bars or strips 10 and 11 made of a metal having a high temperature coefficient of expansion, such as aluminum, brass or an alloy of 60 per cent copper and 40 per cent zinc known as naval brass, and forming together a triangularly shaped expansion bar thermostat. They are mounted at adjacent ends on a supporting strap or bracket 12 which, in turn, is secured to a suitable support or base 13. From the support 12 the bars extend in converging relation at an acute angle with each other toward their opposite ends where portions of predetermined area are secured directly together flatwise, as integrally by means of a brazed or welded joint 14, to form not only a good electrical connection and rigid mechanical connection between the ends of the bars, but also a very efficient thermal conducting connection to provide for the transfer of heat from the bar 11, which is heated, to the bar 10 at a predetermined very high rate. The bars have enlarged cross sections to facilitate the flow of heat by conduction lengthwise of the bars to and from the integral connection 14. Also, to increase the transfer of heat from one to the other by radiation, the bars preferably, as shown, are arranged throughout their lengths in flatwise relation with respect to each other. In order to provide a rigid connection with the bracket 12 the opposite ends of the bars are bent over laterally toward each other to provide overlapping portions 15 and 16 arranged on opposite sides of the supporting strap 12. The transverse portions are clamped together and secured to the supporting strap by means of a bolt 17 passing through suitable holes in the parts with layers of insulation, as shown, around the bolt and between the transverse portions and the supporting strap so that these two ends of the bars are electrically insulated from each other. Clamping plates 17a and 17b are provided under the head and nut of the bolt, these plates being electrically insulated from the portions 15 and 16 by layers of insulating material. This affords a very rigid mechanical connection between the two ends with no possibility of looseness or slippage since any force applied to the transverse portions by the expansion or contraction of the bars is applied to the bolt 17 in a lengthwise direction. It will be observed that the bolt 17 extends in a direction substantially lengthwise of the bars and bisecting the angle between the bars.

It will be understood that when the strip or bar 11 is heated to a higher temperature than the bar 10, the greater elongation of the bar 11 produces a lateral movement of the directly connected ends and the contact 18 carried thereby, this movement being in the plane of the two bars 10 and 11 and in an upward direction, as seen in Fig. 1. The importance of very rigid mechanical connections between the joined ends of the bars will be apparent from the fact that I contemplate the use of relatively short bars, perhaps a few inches in length or less, so that the available useful increase in length of the bar 11 over the bar 10 will be quite small, on the order of .006 inch per 100° C. temperature rise. Thus, for the full utilization of this relatively small increase in the length of the bar 11 over the bar 10 in the production of lateral movement, the two pairs of ends must be secured very rigidly together. This lateral movement results in a small amount of bending of the bars adjacent the mechanically connected portions at each of the two ends, and is much greater than the lengthwise expansion; .006 inch linear expansion produces .025 inch lateral movement in the form shown in Fig. 1, and .06 inch in the form shown in Fig. 4.

Although any suitable heating means may be used, such as a separate heating resistance, I preferably heat the bar 11 by passing the current of the circuit to be protected directly through it. Thus the bar 11 can be connected in the circuit by means of conductors 19 and 20 having their ends electrically connected, as by brazed joints 21 and 22, to opposite ends of the bar.

As shown in Fig. 3, a stationary contact 23 is provided on the end of a flexible bar 24 mounted on the base 13. A portion of the bar 24 carrying the contact extends at right angles with the base so as to give a flexible resilient mounting for the stationary contact. An adjustment screw 25 is provided behind the stationary contact.

In Fig. 2 I have shown the thermal protective device of Fig. 1 connected in a circuit to be protected. Electric current is supplied to a load device 26, which may be a heating resistor, electric motor, etc., from supply mains 27 and 28 through a circuit breaker 29 which is held closed by a suitable latch 30. Upon the occurrence of an excessive current, such as caused by a short circuit, the bar 11 is heated very rapidly substantially independently of the bar 10 and is thereby caused to elongate so as to move the contact 18 into engagement with the contact 23 and close a circuit for the operating coil 31 which moves the latch 30 out of engaging position and trips open the circuit breaker 29.

By means of the thermally conducting connection 14 between the directly joined ends of the bars, and also by means of radiation and convection between the bars and some conduction between the other connected ends, heat is transferred from the bar 11 to the bar 10 at a predetermined rapid rate such that during normal load conditions and overload conditions causing heating of the bar 11, the bar 10 may be heated by conduction, radiation and convection by the bar 11 to a temperature closely approaching the temperature of the bar 11 so that no appreciable or effective lateral movement of the movable contact 18 occurs. The device is thus responsive to the difference between fault or short-circuit currents and previous load currents. In the event of a short circuit current, or suddenly applied very heavy overload current of short-circuit magnitude, the bar 11 is heated very quickly and causes movement of the contact 18 to engage the contact 23 and trip the circuit breaker before the temperature of the bar 10 has time to increase substantially. In other words, the bar 11 under these conditions is heated very quickly to a much higher temperature than the bar 10.

By reducing the rate of heat transfer, such as by inserting a thermal resistance 14' at the apex 14, for example, as shown in Fig. 6, the device can be made to operate like the ordinary bimetallic thermal relay where the heat accumulates so that when a fault occurs the relay operates in much less time than it would if no load current had been flowing prior to the fault.

It can be seen that, by properly controlling the leakage of heat between the two bars, an intermediate condition can be reached where the load current has no effect, i. e., with a given fault current the relay will close its contacts in the same time whether load current was flowing before the fault or not. In this way the device is given the characteristic of the electromagnetic overcurrent relay. This feature is very desirable in protective relays.

Another advantage of the device is that the rapid transfer of heat from the bar 11 to the bar 10 produces a rapid equalization of temperature between the bars after the circuit breaker is opened and the heating current through the bar 11 thereby discontinued. This equalization of the temperatures of the two bars results in a decrease in the temperature of the bar 11 and increase in the temperature of the bar 10 with movement of the contact 18 away from the stationary contact.

When the temperatures of the two bars are substantially equalized, the contact 18 will have been moved back to its normal ambient temperature position. This temperature equalization produces a very rapid resetting or circuit reopening of the thermal device while the bars are at a high temperature and before the bars have time to cool appreciably so that the circuit breaker can, if desired, be reclosed almost immediately or in a very short interval of time after its opening without waiting for the bars to cool to a substantially normal ambient temperature or to their normal load current temperature. In a typical device and with an average short circuit current the temperature of the heated bar reached about 100° C. above ambient temperature. It will be obvious also that the device is self compensating for changes in ambient temperature.

Preferably, as shown, the heated bar 11 is formed with a semicircular or U-shaped cross section substantially throughout its length, the section being concave on the outside, or lower side as seen in Fig. 1. As further shown, the conductor 20 is provided with an insulating sleeve 32 and is conveniently placed between the sides 33 and 34 of the arm 11. This arrangement of the conductor 20 prevents interference with the movement of the contact and also provides for utilization of the heat generated in the conductor. The U-shaped cross section of the bar 11 is provided for the purpose of making the bar more rigid against compression forces for it will be observed that the bar 11, when it elongates upon an increase in temperature, is subjected to a compression force against the opposing force of the bar 10.

The amount of movement of the connected ends carrying the movable contact 18 can be regulated by suitably selecting the distance between the ends of the bars at the point where they are connected to the supporting bracket 12, the movement varying inversely in accordance with the distance between the bars at the bracket, i. e., at the base of the triangle formed by the bars. In other words, to increase the movement of the contact 19 for a given temperature change the distance between the bars at the supporting bracket is decreased.

Another advantage of this device is its resistance to shock and vibration because of the angle between the two bars, by reason of which the arm formed by the two bars is very rigid in the direction of its movement. Rigidity is given the two bars in the transverse direction by reason of the fact that they are mounted with their greatest dimensions in that direction. The device, moreover, is light, compact and inexpensive to manufacture. The cost is about a tenth of that of a bimetallic strip compensated for temperature ambient.

In the modified form of my invention shown in Figs. 4 and 5, the thermostat comprises bar 35 mounted in edgewise relation with respect to a heated bar 36, which has a U-shaped cross section with its sides embracing the bar 35 at their upper ends. Also, the upper ends of the two bars are joined together by a pivot pin 37, while the lower ends of the bars are connected by pivot pins 38 and 39 to a rigid support 40 in suitable spaced relation with each other. In order to eliminate looseness, the pivot pins are fitted very closely in apertures in the bars and any looseness is furthermore taken up by a tension spring 41 having one end connected to the pivot 37 or to the upper ends of the bars and applying a force thereto toward the right, as seen in Fig. 4.

In the device of Figs. 4 and 5, the arrangement of the bar 35 in the trough of the bar 36 so that the sides of the bar 36 partially enclose the bar 35 increases the rate of transfer of heat by radiation from the bar 36 to the bar 35.

Preferably, the device of Figs. 4 and 5 will be electrically connected in a load circuit to be protected, as shown in Fig. 2. The bar 36 may be connected in the circuit to be protected by conductors 42 and 43 so as to be heated by the load current. The upper movable end of the bars actuates a movable contact 44. The operation of the device is the same as described in connection with Figs. 1, 2 and 3.

The modified form shown in Figs. 4 and 5 has no lost motion due to loading at places other than the pivots 38 and 39. It gives about twice the lateral motion as the device of Fig. 1 for the same temperature differential.

The form illustrated in Fig. 1 is suitable for applications where low cost and great force are required, such as for the direct tripping of circuit breakers. The form shown in Fig. 4 is more suitable for relays where great sensitivity is required and great force is not necessary. Great force can be obtained from the device of Fig. 4, but the reaction at the pins 38 and 39 is amplified by leverage so as to tend to shear the pins or tear the metal of the bars.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A thermal short-circuit protective device comprising two bars of metal having substantially the same temperature coefficients of expansion, a support, spaced apart connections between two ends of said bars and said support including means for insulating said two ends from each other and from the support, a mechanical and heat conducting connection between the other second two ends of said bars whereby said ends are caused to move laterally in response to a difference in the temperatures of said bars, one of said bars forming electric current conducting means whereby deflection of the bar is responsive to rapid changes in the current in an electric circuit to be protected, said bars being arranged for rapid transfer of heat from said heated bar to the other bar thereby to equalize substantially the temperatures of said bars for currents in said circuit of normal and overload values so that no appreciable movement of said second two ends is produced by said currents and to equalize quickly the temperatures of said bars before substantial cooling of said bars after a current of short-circuit magnitude in said circuit has effected the movement of said second two ends.

2. A thermal protective device comprising two bars of metal having substantially the same temperature coefficients of expansion extending at an acute angle with relation to each other, a connection between adjacent ends of said bars at the apex of said angle, said connection providing for the rapid conduction of heat from one bar to the other, a mechanical connection between the other ends of said bars comprising means for electrically insulating said other ends from each other, a support for said bars to which said other ends are connected, one of said bars forming electric current conducting means whereby deflection of the bar is responsive to rapid changes in the current in a circuit to be protected to cause lateral movement of said adjacent ends in response to a difference between the temperatures of said bars, said bars being arranged for the transfer of heat rapidly by conduction, radiation and convection from said heated bar to the other bar so that no effective movement of said connected ends is produced by normal and overload currents and the temperatures of said bars are substantially equalized before substantial cooling of said bars after a current in said circuit of short-circuit magnitude has effected movement of said connected ends.

3. A thermal protective device comprising two bars of metal having substantially the same temperature coefficients of expansion extending at an acute angle with relation to each other, a connection between adjacent ends of said bars at the apex of said angle, said connection providing for the rapid conduction of heat from one bar to the other and said bars having an increased cross section to facilitate the flow of heat by conduction lengthwise of said bars to and from said connection, a mechanical connection between the other ends of said bars comprising means for electrically insulating said other ends from each other, a support for said bars to which said other ends are connected, one of said bars forming electric current conducting means whereby deflection of the bar is responsive to rapid changes in the current in a circuit to be protected to cause lateral movement of said adjacent ends in response to a difference in the temperatures of said bars, said bars being arranged for the transfer of heat from one to the other by radiation and convection whereby heat is transferred rapidly by conduction, radiation and convection from said heated bar to the other bar so as to equalize substantially the temperatures of said bars to prevent movement of said adjacent ends when the current in said circuit is of overload magnitude but produce movement of said adjacent ends in response to currents of short-circuit magnitude.

4. A thermal protective device comprising two bars of metal having substantially the same temperature coefficients of expansion, a mechanical and heat conducting connection between a first and two end portions of said bars, said bars being shaped to extend from said connected ends in diverging relation at an acute angle with each other, a support, a connection between the opposite ends of said bars and between said opposite ends and said support comprising means for electrically insulating said opposite ends from each other, one of said bars forming electric current conducting means whereby deflection of the bar is responsive to rapid changes in the current in an electric circuit to be protected, said bars being arranged with respect to each other to give a substantial rate of transfer of heat between them by radiation and convection and by conduction between said first connected end portions from said heated bar whereby heat is transferred to the other bar at a high rate sufficient to equalize substantially the temperatures of said bars for currents in said circuit of normal and overload values so that substantially no lateral movement of the first connected end portions of said bars is produced during normal loads or overloads, and to equalize quickly the temperatures of said bars after a current of short-circuit magnitude in said circuit thereby to bring said first connected end portions back to predetermined positions before substantial cooling of said bars.

5. A thermal protective device comprising two bars of metal having substantially the same temperature coefficients of expansion, a rigid mechanical and heat conducting connection between a first two end portions of said bars connecting said end portions flatwise together, said bars being shaped to extend from said connected ends in diverging relation at an acute angle with each other, a support, rigid electrically insulating connections between the opposite ends of said bars and between said opposite ends and said support, one of said bars forming electric current conducting means whereby deflection of the bar is responsive to rapid changes in the current in an electric circuit to be protected, said bars being arranged flatwise with respect to each other to give a substantial rate of transfer of heat between them by radiation and convection and by conduction between said first connected end portions from said directly heated bar whereby heat is transferred to the other bar at a high rate sufficient to equalize substantially the temperatures of said bars upon current in said circuit of normal and overload values so that substantially no lateral movement of the first connected end portions of said bars is produced during normal loads or overloads, and to equalize quickly the temperatures of said bars after a current of short-circuit magnitude through said heated bar.

6. A thermal protective device comprising two bars of metal having substantially the same temperature coefficients of expansion extending at an acute angle with relation to each other, a rigid integral connection between the intersecting ends of said bars at the apex of said angle, said connection providing for the rapid conduction of heat from one bar to the other and said bars having enlarged cross sections to facilitate the flow of heat by conduction lengthwise of said bars to and from said integral connection, a rigid mechanical connection between the other ends of said bars comprising means for electrically insulating said other ends from each other, a support for said bars to which said other ends are connected, one of said bars forming electric current conducting means whereby deflection of the bar is responsive to rapid changes in the current in a circuit to be protected to cause lateral movement of said integrally connected ends in response to a difference between the temperatures of said bars, said bars being arranged in flatwise relation with respect to each other to facilitate the transfer of heat from one to the other by radiation and convection, whereby the transfer of heat by conduction, radiation and convection from said heated bar to the other bar is sufficiently rapid to equalize substantially the temperatures of said bars for currents in said circuit up to and including overload magnitudes so that said heated bar is heated to a temperature substantially higher than the temperature of the other bar only by currents in said circuit of short-circuit magnitude thereby to cause lateral movement of said integrally connected ends.

7. A thermal protective device comprising two bars of metal having high temperature coefficient of expansion, a rigid mechanical and heat conducting connection between two first ends of said bars, said bars being shaped to extend from said connected ends in diverging relation at an acute angle with each other, overlapping transversely extending portions on the other ends of said bars, a support, a bolt extending substantially lengthwise with relation to said bars for clamping said end portions to said support, layers of electrically insulating material insulating said bars from each other and from said support, one of said bars forming electric current conducting means whereby to cause the bar to expand and cause movement of said first ends in response to a current of short-circuit magnitude, said connection between said first ends transferring heat rapidly by conduction from the current conducting bar to the other bar whereby the temperatures of said bars are rapidly equalized.

8. A thermal protective device comprising a first bar of metal having a rectangular cross section, a second bar of metal having a U-shaped cross section, a support, spaced apart pivotal connections between one end of each of said bars and said support, said second bar being arranged with its open side adjacent said first bar, and a pivotal connection between the other movable ends of said bars with said first bar extending between the sides of said second bar whereby heat is transferred rapidly from said second bar to said first bar, said second bar forming electric current conducting means whereby to cause lateral movement of said connected ends in response to rapid changes in current flowing in the bar.

9. A thermal protective device comprising two juxtaposed bars of metal having substantially the same temperature coefficients of expansion, said bars being positioned longitudinally to form an acute angle and one of said bars having a generally U-shaped cross section, a rigid connection between said bars at each of the adjacent ends thereof, at least one of said connections comprising means for electrically insulating the bars from each other at the respective connection, means for preventing movement of one of said connections, one of said bars forming electric current conducting means whereby deflection of the bar is responsive to rapid changes in the current in a circuit to be protected whereby to effect lateral movement of the other end connection of said bars in response to a difference between the temperatures of said bars.

10. A thermal protective device comprising two juxtaposed bars of metal having substantially the same temperature coefficients of expansion, said bars being positioned longitudinally for a predetermined separation at one end and one of said bars being constructed to have materially greater rigidity than the other bar, a rigid connection between said bars at each of the adjacent ends thereof, at least one of said connections comprising means for electrically insulating the bars from each other at the connection, means for preventing movement of one of said connections, and means for permanently connecting only said one bar in series in a circuit to be protected for effecting lateral movement of the other end connection of said bars in response to a difference between the temperatures of said bars in consequence of a sudden increase in current flow in said one bar.

11. A thermal protective device comprising two juxtaposed bars of metal having substantially the same temperature coefficients of expansion, said bars being positioned longitudinally to form an acute angle and one of said bars having a generally U-shaped cross section with the convex surface toward the other bar, a rigid connection between said bars at each of the adjacent ends thereof, the connection at the spaced end of the bars comprising means for electrically insulating the spaced ends, means for preventing movement of the spaced end connection, and means for directly heating the U-shaped bar in accordance with the current in the circuit to be protected to effect lateral movement of the other end connection of the bars in response to a difference between the temperatures of the bars including a conductor lying within the concavity of the U-shaped bar and connected to the free end thereof.

12. A thermal protective device comprising two juxtaposed bars of metal having substantially the same temperature coefficients of expansion, said bars being positioned longitudinally to form an acute angle and one of said bars having a generally U-shaped cross section with the convex surface toward the other bar, a rigid connection between said bars at each of the adjacent ends thereof, said connections comprising means for electrically insulating the bars from each other at one end and thermally insulating the bars from each other at the opposite end, means for preventing movement of the spaced end connection of said bars, and means for directly heating only the U-shaped bar in accordance with the current in the circuit to be protected to effect lateral movement of the other end connection of said bars in response to a difference between the temperatures of the bars.

13. A thermal protective device comprising two juxtaposed bare metallic bars having substantially the same temperature coefficients of expansion, said bars being positioned longitudinally for a predetermined separation at one end and one of said bars being constructed to have materially greater rigidity than the other bar, a rigid connection between said bars at each of the adjacent ends thereof, at least one of said connections comprising means for electrically insulating the bars from each other, means for preventing movement of one of said connections, and means for connecting only said one bar in series relation with a circuit to be protected to effect lateral movement of the other end connection of said bars in response to a difference between the temperatures of the bars in consequence of an increase in current flow in said one bar.

ALBERT R. van C. WARRINGTON.